United States Patent
Konagaya

(10) Patent No.: US 7,034,450 B2
(45) Date of Patent: Apr. 25, 2006

(54) LIGHT SOURCE DEVICE AND LIGHT SOURCE DEVICE FOR IMAGE READING DEVICE

(75) Inventor: Tatsuya Konagaya, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 287 days.

(21) Appl. No.: 10/386,114

(22) Filed: Mar. 12, 2003

(65) Prior Publication Data

US 2003/0210558 A1    Nov. 13, 2003

(30) Foreign Application Priority Data

Mar. 12, 2002   (JP)   ............................. 2002-067203

(51) Int. Cl.
*H04N 1/04* (2006.01)
*H05B 33/00* (2006.01)
*F21V 7/04* (2006.01)

(52) U.S. Cl. ...................... 313/498; 313/501; 362/555

(58) Field of Classification Search ................ 358/475, 358/480, 482, 483, 484; 313/498, 506; 362/555, 362/583; 348/294; 359/196
See application file for complete search history.

(56) References Cited

U.S. PATENT DOCUMENTS

| 2,978,417 | A | * | 4/1961 | Larach ................. 252/301.6 S |
| 5,313,289 | A | * | 5/1994 | Nagane et al. .............. 358/475 |
| 5,420,712 | A | * | 5/1995 | Maeda et al. ............... 359/196 |
| 5,802,086 | A | * | 9/1998 | Hargis et al. ................. 372/22 |
| 6,141,030 | A | * | 10/2000 | Fujita et al. ................ 347/233 |

FOREIGN PATENT DOCUMENTS

| JP | 10312480 A | * | 11/1998 |
| JP | 2001-111795 | | 4/2001 |
| JP | 2001111782 A | * | 4/2001 |

* cited by examiner

Primary Examiner—Ashok Patel
(74) Attorney, Agent, or Firm—Sughrue Mion, PLLC

(57) ABSTRACT

A light source device including at least one first substrate, at least one second substrate, first light emitting elements, which emit red color light, and second light emitting elements, which emit infrared rays. The first light emitting elements are disposed at the first substrate, and the second light emitting elements are disposed at the second substrate. The light source device further has a light damping member, which dampens the infrared rays, and a transmitting member through which the infrared rays pass. The light damping member is disposed to correspond to the first substrate, and the transmitting member is disposed to correspond to the second substrate.

18 Claims, 8 Drawing Sheets

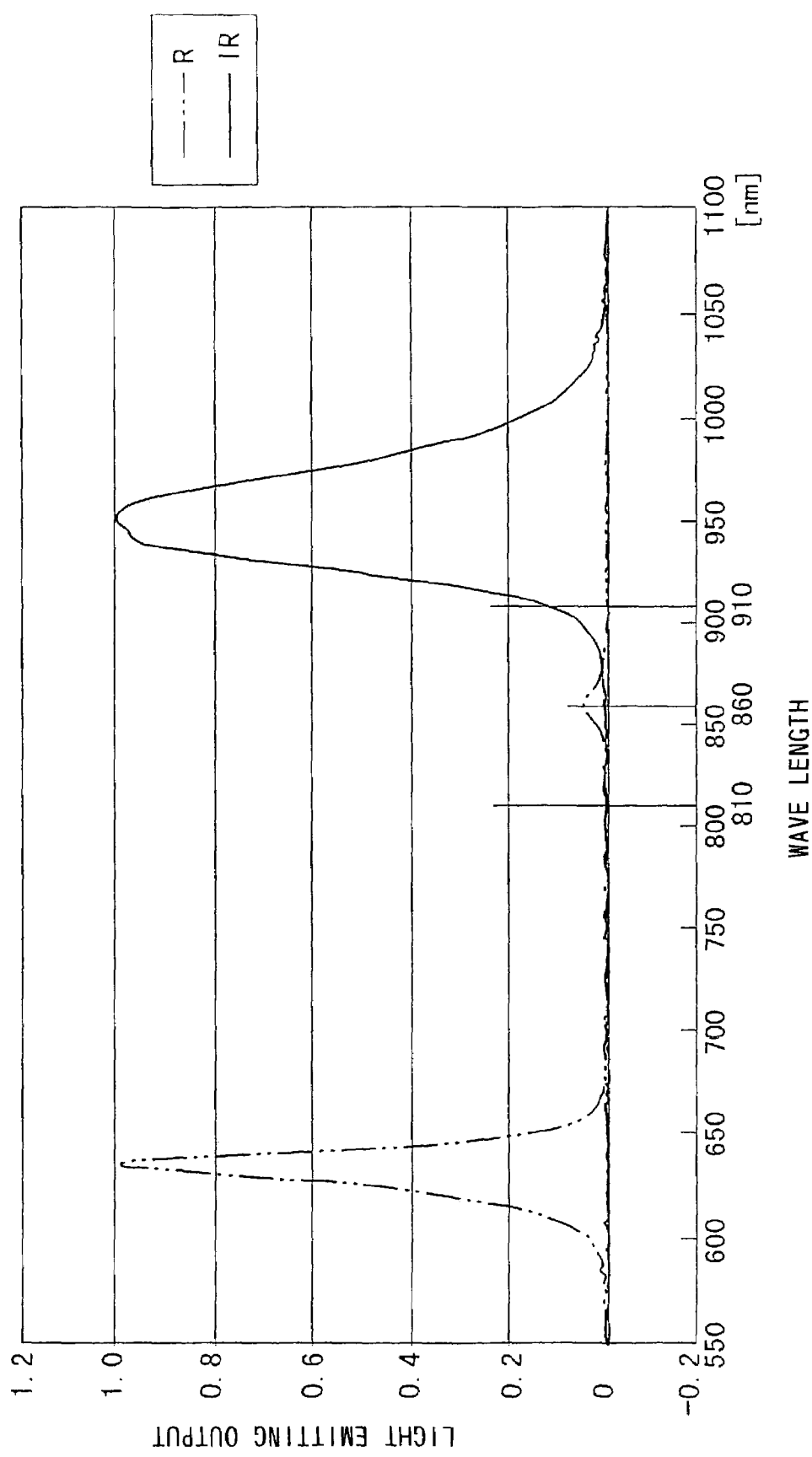

LIGHT SOURCE DEVICE AND LIGHT SOURCE DEVICE FOR IMAGE READING DEVICE

BACKGROUND OF THE INVENTION

1. Field of the Invention

The present invention relates to a light source device. In particular, the present invention relates to a light source device used in an image reading device or the like which, by an optical system, focuses light which has passed through an original onto an image pick-up device, and which photoelectrically reads the image information of the original.

2. Description of the Related Art

Devices have been widely used which form images on recording materials as follows: the device carries out image processing (such as enlargement or reduction of an image, correction of missing portions of the image caused by scratching of the film or the like) on digital image data which is read by using an image reading device which, by an optical system, focuses a ray, which has passed through a frame image recorded on an original such as a photographic film, onto an image pick-up device such as a CCD or the like, and photoelectrically reads the image information of the frame image. The device forms an image on a recording material by laser light which has been modulated on the basis of the digital image data which has been subjected to the image processings.

There have conventionally been such image reading devices which read an image of a photographic film, which is set at a film carrier disposed on a carrier stand provided at a table, by an image pick-up unit disposed above the table of the device main body. The image pick-up unit focuses the image of the photographic film onto an image pick-up device at a necessary magnification by a lens unit.

Ternary light-emitting diode (LED) elements which emit lights of red (R), green (G) and blue (B), and LED elements emitting infrared rays (IR) which are invisible light which is non-responsive to these color wavelengths (i.e., non-responsive to image information of wavelengths in the visible light region) are provided below the carrier stand as the light source device. An LED light source, which is structured by these elements being distributed and arrayed uniformly on a flat surface of a single substrate, is provided, and a filter and a diffusion box are provided above the LED light source. The luminous flux of the light emitted from the LED light source, which is modulated at the filter and thereafter being diffused within a predetermined range in the light-diffusing box, passes through the photographic film which is set within the film carrier on the carrier stand, and is projected onto the image pick-up unit.

When an image is read by an image reading device having the above-described structure, the light emitted from the LED light source passes through the film, is condensed at the lens of the lens unit, and is focused on the CCD, and the image data is read.

There are cases in which missing portions arise on the image when the film surface is scratched or when the image is affected by dust or the like existing on the optical path from the light source to the film (hereinafter, such scratches, effects and the like will collectively be termed "defect portions"). In order to prevent such missing portions from arising, at the image reading device, when the image is read by infrared rays, only the portions at which light scatters due to these defect portions are detected. The missing portions of the image at these defect portions are, at a central processing unit, subjected to image processing for digital correction on the basis of the image information of the region at the periphery of the defect portion.

In such an image reading device, it has been thought preferable to improve the read image quality by using, for the light source of the optical system, a quaternary LED light source rather than a ternary LED light source, in order to improve the read image quality.

Thus, by changing the 650 nm wavelength of light emitted by the R color LED elements in a ternary LED light source to a 630 nm wavelength of light emitted by the R color LED elements in a quaternary LED light source, an attempt has been made to improve the image quality of the image read by the image reading device.

However, the light emitted by the R color LED elements in a quaternary LED light source includes sub-emitted light in a vicinity of the wavelength of 860 nm which is the secondary peak wavelength, i.e., includes infrared rays which are invisible light.

There is hardly any difference between the transmittance of this sub-emitted light with respect to the deep colored portions of the image of color wavelengths (i.e., wavelengths in the visible light region) of the photographic film, and the transmittance of this sub-emitted light with respect to the pale colored portions. Thus, the problem arises that the device will not be able to accurately read the degree of contrast in the image information of red wavelengths in the visible light region of the image.

Thus, in an optical system of an image reading device using quaternary LED elements as the light source, it has been thought to remove the sub-emitted light, which is infrared rays in a vicinity of a wavelength of 860 nm which are emitted by the R color LED elements, by mounting an infrared ray filter to the light source. However, the infrared rays which are in a vicinity of a wavelength of 950 nm, which are emitted by the plural infrared ray (IR) LED elements distributed and arrayed on the substrate of the quaternary LED light source, are simultaneously cut by the infrared ray filter.

Thus, there is the problem that, even when defect portions exist on a film, when the image is read as described above, it is not possible to detect the portions where light scatters due to the defect portions, and is not possible to carry out processings such as image correction and the like.

Further, quaternary LED light sources generate heat at the time of emitting light. Thus, as a measure to dissipate heat, the LED elements have been mounted to an aluminum or ceramic substrate. Therefore, the problem arises that the light source becomes expensive.

SUMMARY OF THE INVENTION

In consideration of the above-described problems, an object of the present invention is to improve performance by improving the image quality read by using light-emitting elements, such as a quaternary LED light source or the like, in an optical system of an image reading device. Another object of the present invention is to provide a light source device for an image reading device in which missing portions of an image, which are caused by defect portions arising due to scratching of the film surface or the like, can be detected by using infrared rays and can be subjected to image processing for correction, and in which the light source can be manufactured inexpensively.

A light source device for an image reading device relating to a first aspect of the present invention comprises: a substrate group formed from first substrates and second substrates, and in which a pair of the first substrates are disposed symmetrically with respect to a center of the substrate group, and a pair of the second substrates are disposed symmetrically with respect to the center of the substrate group and at positions that are different than positions of the first substrates; light emitting elements, which emit red color light and are disposed at one of the first substrates and the second substrates; and light emitting elements, which emit infrared rays and are disposed at the other of the first substrates and the second substrates.

The red color light and the light of infrared ray, which are emitted from the pair of first substrates and the pair of second substrates at the substrate of the light source device, can be uniformly distributed on the optical path of the optical system. Further, the light emitting elements which emit red color light and the light emitting elements which emit infrared rays, which light emitting elements are mounted on the substrate of the light source device, are disposed separately at the first substrates and the second substrates which are respectively different substrates. In this way, when there is trouble with either of the first substrates or the second substrates, it suffices to replace the substrate with which there is a problem, and maintenance can be carried out easily and inexpensively.

In the first aspect, the first substrates may be formed from one of an aluminum material and a ceramic material, and the second substrates maybe formed from a glass epoxy material, and the first substrates may include light emitting elements, which emit green color light, light emitting elements, which emit blue color light, and the light emitting elements, which emit infrared ray, and the second substrates may include the light emitting elements, which emit red color light.

Moreover, in the first aspect, the first substrates may be formed from one of an aluminum material and a ceramic material, and the second substrates may be formed from a glass epoxy material, and the first substrates may include light emitting elements, which emit green color light, light emitting elements, which emit blue color light, and the light emitting elements, which emit red color light, and the second substrates may include the light emitting elements, which emit infrared rays.

The substrate of the light source device can be manufactured inexpensively by using, at portions thereof, the second substrates formed of glass epoxy which is inexpensive. Further, at least the light emitting elements which emit red color light, for carrying out the processing of reading the image, and the light emitting elements which emit infrared rays for carrying out image correction processings such as scratch elimination and the like, are disposed separately from one another at the first substrates and the second substrates. In this way, when there is trouble with either of the first substrates or the second substrates, it suffices to replace the substrate with which there is a problem, and maintenance can be carried out easily and inexpensively.

Furthermore, the light source device for an image reading device of the first aspect may further comprise a heat dissipating mechanism including: wiring structures for conducting electricity to the light emitting elements mounted on the second substrates; and heat conducting structures for heat dissipation which are connected to the wiring structures for conducting electricity so as to be able to transfer heat energy, and which cool the light emitting elements by dissipating heat by conducting, to heat dissipating portions, the heat energy transferred from the portions of the heat conducting structures connected to the wiring structures for conducting electricity.

Even if heat is generated at the time that light is emitted from the light emitting elements mounted to the glass epoxy second substrates of the light source device, this heat energy is transferred from the wiring structures for conducting electricity, to the heat conducting structures for heat dissipation which are connected to the wiring structures for conducting electricity. It is therefore possible to appropriately dissipate heat from the heat conducting structures for heat dissipation. In this way, the light emitting elements are cooled, and the light emitting elements mounted to the glass epoxy second substrates can stably operate and emit light. Accordingly, the substrate of the light emitting device can be manufactured inexpensively by using, at portions thereof, the second substrates formed of glass epoxy which is inexpensive.

The light emitting elements may be formed from light emitting diodes. Alternately, the light emitting elements may be formed from electroluminescent elements.

By appropriately using light emitting diodes or electroluminescent elements as the light emitting elements mounted to the light source device, it is possible to form a light source having various light emitting characteristics.

A light source device for an image reading device relating to a second aspect of the present invention comprises: a substrate; a first light emitting element emitting red color light for reading image information of an image of an original by the emitted light being at least one of transmitted through and reflected by the original, the first light emitting element including a secondary peak emission, a wavelength of which corresponds to infrared ray wavelength region; a second light emitting element emitting infrared rays, which are invisible, utilized for detecting defect portions of the original and dust existing on an optical path of an optical system; and a light damping member for damping the light in an infrared ray wavelength of the first light emitting element and disposed on the path by which the light emitted by the first emitting element reaches an image pick-up device of the image reading device, wherein the first light emitting element and the second light emitting element are disposed on the substrate.

In the above structure, when the first light emitting elements emit light to read an image information, the secondary peak emissions of the first light emitting elements, which secondary peak emissions are light within the infrared ray range, can be cut by the light damping members disposed on the optical path leading to the image pick-up device. Accordingly, only the required red light can reach the image pick-up device, and thus, the degree of the contrast of the image information corresponding to the red color wavelength of a visible light wavelength range in the image of the original can be accurately reflected and read. Specifically, when reading a high density original by the image reading device, the above structure can effectively prevent the secondary peak emissions within an infrared ray range from reaching the image pick-up device and making the expression of the density difference poor (i.e., the expression of the black depth), and thus, the image can be read with a wide dynamic range.

Further, since the light damping members are disposed to only dampen the secondary peak emissions, which wavelength is within the infrared ray range, of the first light emitting elements, the infrared rays which are emitted from the second light emitting elements will not be dampened. Accordingly, even if the light damping members are disposed, a situation in which additional second light emitting elements must be provided due to insufficient light-quantity of infrared rays, which are an invisible light, being emitted from the second light emitting elements, does not occur. Therefore, the structure can be simplified.

Further, in the second aspect, the substrate on which the first light emitting element is disposed and the substrate on which the second light emitting element is disposed are separately formed, and one of the substrates comprises one of aluminum material and ceramic material, and the other comprises glass epoxy material.

If the conditions such as variation levels of the light-quantity and wavelength are not satisfied when one of the light emitting elements is disposed on the glass epoxy substrate, then the light emitting element is disposed on the aluminum or ceramic substrate. If the conditions of the variation levels of the light-quantity and wavelength or the like of the other light emitting element can be satisfied when disposed on a glass epoxy substrate, the other light emitting element is disposed on the inexpensive glass epoxy substrate. In this way, the light source device for an image reading device can be formed inexpensively compared with a case in which the entire substrate is formed by aluminum material or ceramic material.

A light source device relating to a third aspect of the present invention comprises: at least one first substrate; at least one second substrate; first light emitting elements, which emit red color light; and second light emitting elements, which emit infrared rays, wherein the first light emitting elements are disposed on the first substrate, and the second light emitting elements are disposed on the second substrate.

A method of manufacturing a light source device relating to a fourth aspect of the present invention comprises the steps of: disposing light emitting elements, which emit red color light, at a first substrate; and disposing light emitting elements, which emit infrared rays, at a second substrate.

BRIEF DESCRIPTION OF THE DRAWINGS

FIG. 8 is a characteristic diagram showing wavelength characteristics of a red light emitted from a quaternary light emitting diode (LED) element and wavelength characteristics of an infrared ray emitted from an LED element which emits infrared ray, which LED elements are used in the light source device of the present invention.

DESCRIPTION OF THE PREFERRED EMBODIMENT

A digital lab system, which is equipped with a light source device relating to an embodiment of the present invention, will be described with reference to FIGS. 1 through 7.

Digital Lab System

Figure 4:
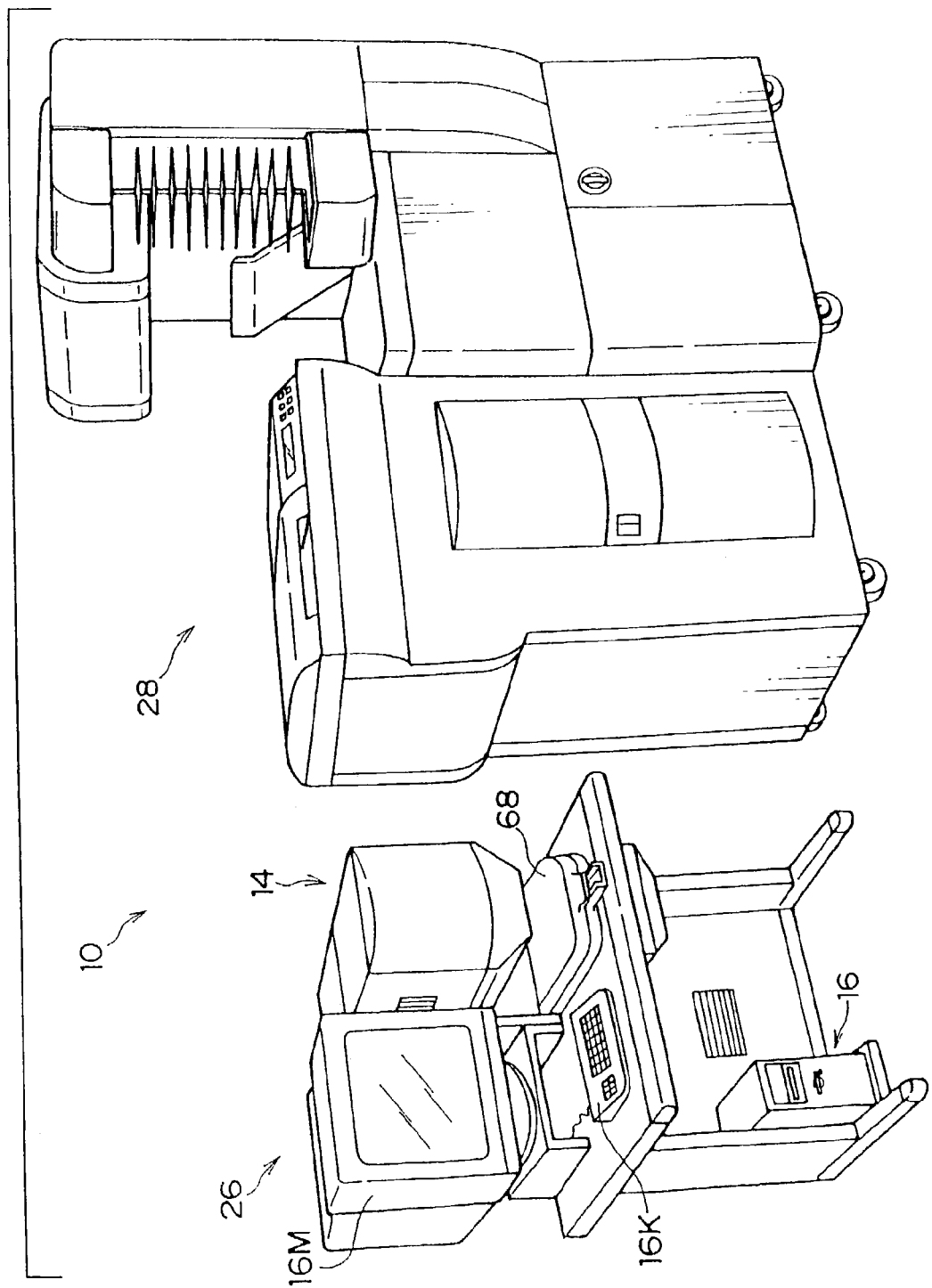
FIG. 4 is a schematic overall perspective view showing a digital lab system utilizing an image reading device equipped with the light source device relating to the embodiment of the present invention.
Figure 5:
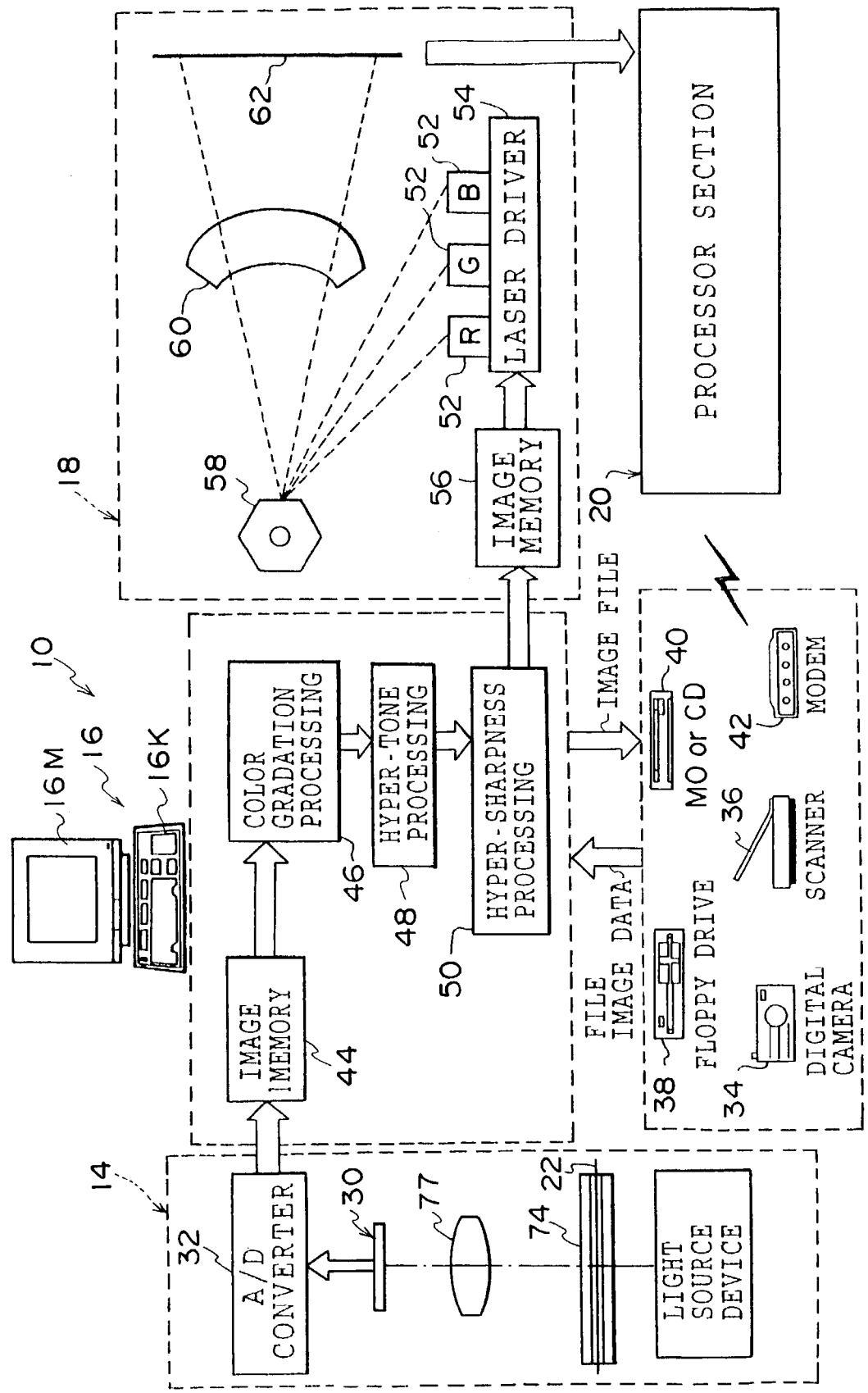
FIG. 5 is an overall schematic structural view of the digital lab system shown in FIG. 4.

An image reading device having the light source device relating to the present embodiment forms one part of a digital lab system 10 shown in FIGS. 4 and 5. In the digital lab system 10, a charge-couple device (CCD) scanner section 14 serving as an image reading device and an image processing section 16 are provided at an input section 26. Further, a laser printer section 18 and a processor section 20 are provided integrally at an output section 28.

The CCD scanner section 14 is for reading frame images recorded on photographic films such as negative films, reversal films or the like. For example, frame images of 135 size photographic films, 110 size photographic films, photographic films at which a transparent magnetic layer is formed (240 size photographic films which are called APS films), 120 size and 220 size photographic films, and the like can be used as the object of reading.

As shown in FIG. 5, the CCD scanner section 14 reads the frame image, which is the object of reading, by a CCD sensor 30 which is an image pick-up element. The image data, which is obtained by the output signal of the CCD sensor 30 being A/D converted at an A/D converter 32, is outputted to the image processing section 16.

The image data outputted from the CCD scanner section 14, i.e., scan image data, is inputted to the image processing section 16. Image data obtained by photographing by a digital camera 34 or the like, image data obtained by an original (e.g., a reflection original or the like) being read by a scanner 36, image data generated by another computer and stored in a floppy disk drive 38, an MO drive or a CD drive 40, or the like, image data received via a modem 42, or the like, also can be inputted to the image processing section 16 from the exterior.

The image processing section 16 stores the inputted image data in an image memory 44, and is provided with a color gradation processing section 46, a hyper-tone processing section 48, a hyper-sharpness processing section 50, and the like, and can carry out various types of correction.

The image processing section 16 also can carry out image processings such as scratch eliminating correction of a film by using the image data read by infrared rays.

The image processing section 16 outputs, to the laser printer section 18, image data for recording which has been subjected to image processings such as the above-described corrections. The image processing section 16 can also output the image-processed image data as an image file to the exterior by, for example, outputting the image data onto a recording medium such as an FD, MO, CD or the like, transmitting the image data to another information processing device via a communication line, or the like.

The laser printer section 18 has laser light sources 52 emitting lights of the colors of red (R), green (G), blue (B) At the laser printer section 18, a laser driver 54 is controlled such that laser light, which is modulated in accordance with the image data for recording which has been inputted from the image processing section 16 and stored in an image memory 56, is irradiated onto a photographic printing paper 62. By irradiating the laser light onto the photographic printing paper 62, scan-exposure is carried out (in the present embodiment, scan-exposure is mainly carried out by an optical system using a polygon mirror 58 and an fθ lens 60), such that an image is recorded on the photographic printing paper 62. At the processor section 20, the photographic printing paper 62 on which the image has been recorded is subjected to the respective processings of color developing, bleach-fixing, rinsing, drying and the like, such that the image is formed on the photographic printing paper 62. CCD Scanner Section Next, the CCD scanner section provided with the light source device relating to the present embodiment will be described in accordance with FIGS. 1 through 7.

Figure 1:
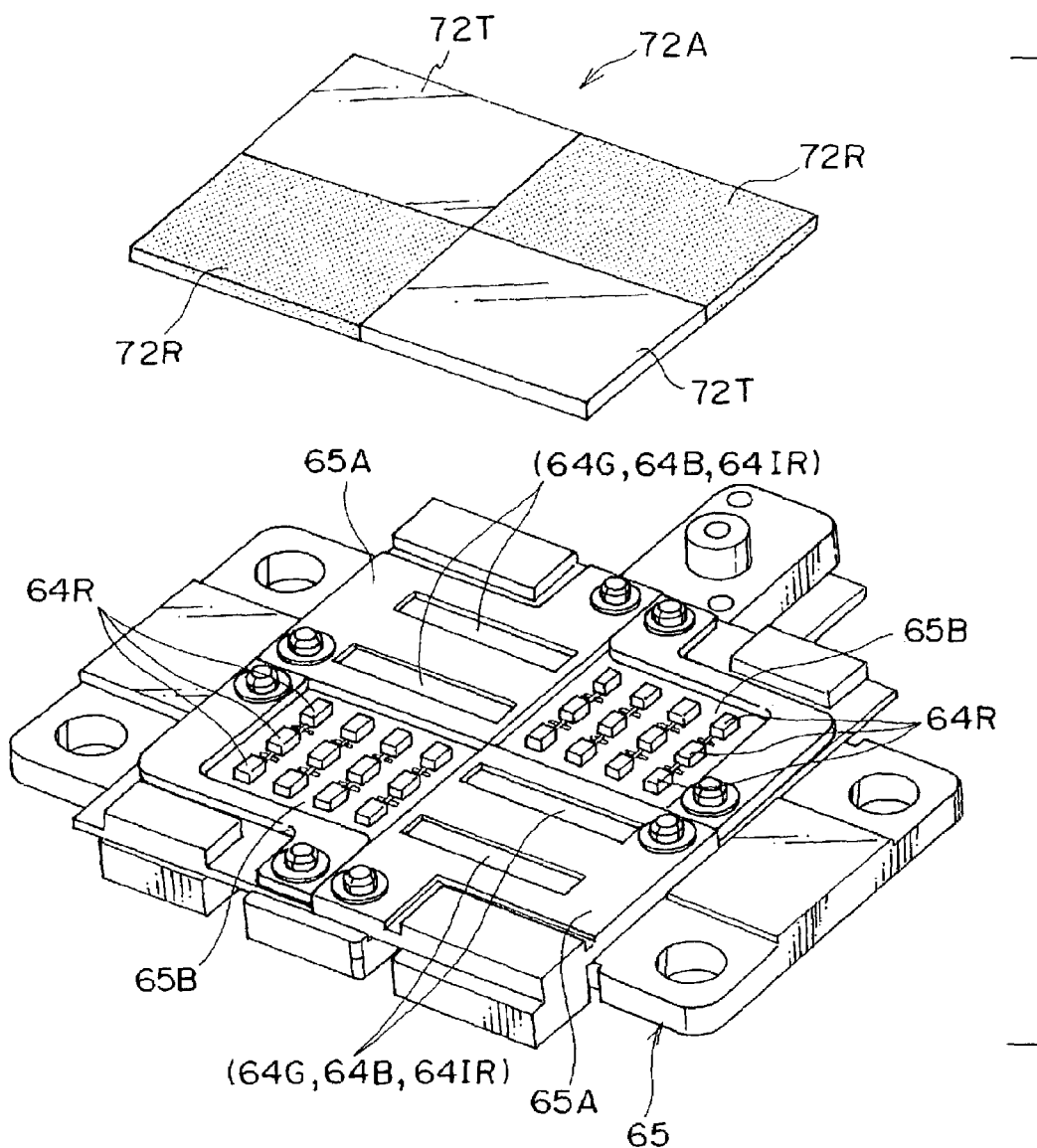
FIG. 1 is an exploded perspective view showing a light source device relating to an embodiment of the present invention.

The schematic structure of the optical system relating to the CCD scanner section 14 for a 135 size photographic film 22 is shown in FIG. 1. The light source device having the optical system has, as the light source irradiating visible light onto the photographic film 22, a plurality of LED chips 64R, 64G, 64B which emit lights of the colors of R, G, B, respectively. Further, the light source device has a plurality of LED chips 64IR, which emit infrared rays, as the light source for irradiating invisible light for defect portion detection onto the photographic film 22. The plurality of LED chips 64R, 64G, 64B and the plurality of LED chips 64IR are divided into two groups and appropriately disposed on two types of substrates. A substrate 65, at which these two types of substrates are integrated, is provided.

As shown in FIGS. 1 through 6, in the optical system relating to the CCD scanner section 14, the rectangular substrate 65 at the light source device is structured such that four divisional sections thereof are arranged in a checked pattern. Note that the substrate 65 may be formed by partitioning the flat surface portion thereof into a checked pattern.

Namely, rectangular first substrates 65A and rectangular second substrates 65B are disposed on the respective diagonal directions of the substrate 65. All of the first substrates 65A and second substrates 65B are integrated so as to form the single substrate 65 for the light source. The first substrates 65A are formed of an aluminum material or a ceramic material which have an excellent heat dissipating property but are expensive. The second substrates 65B are formed from a glass epoxy material whose heat dissipating property is inferior to that of the first substrates 65A, but which is less expensive.

An LED chip group is mounted on each of the first substrates 65A such that the plurality of LED chips 64G and 64B which emit lights of the colors of G and B, and the plurality of LED chips 64IR which emit infrared rays for defect portion detection, are lined up so as to be distributed uniformly.

The plurality of LED chips 64R which emit light of the R color are mounted on the second substrates 65B so as to be lined up to be distributed uniformly. Commercially-available red LED elements, which are respectively integrally formed with small ceramic boxes, can be used as the respective LED chips 64R which emit light of the R color.

Figure 2:
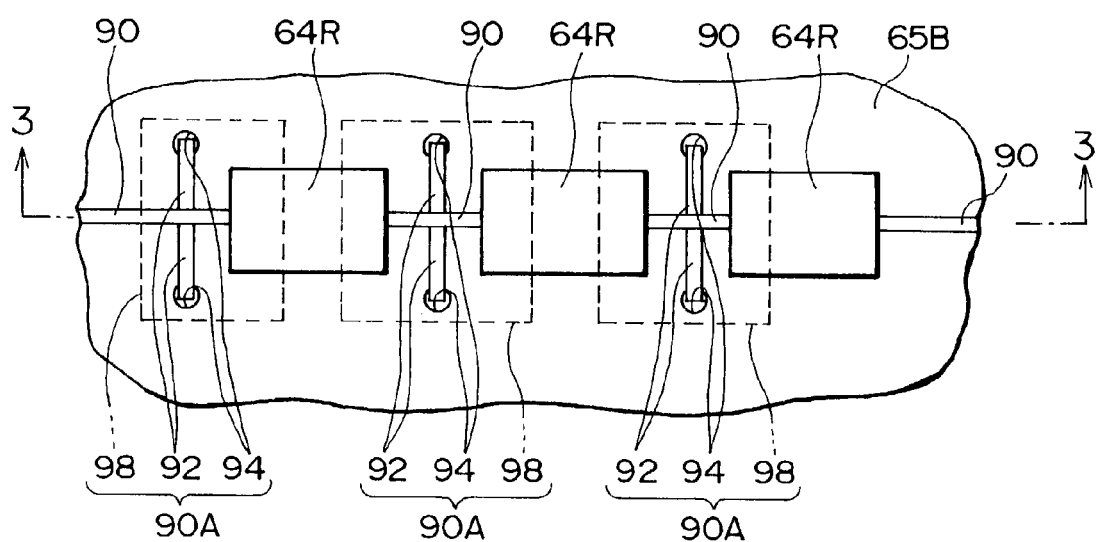
FIG. 2 is an enlarged plan view showing a heat dissipating mechanism in a second substrate shown in FIG. 1.
Figure 3:
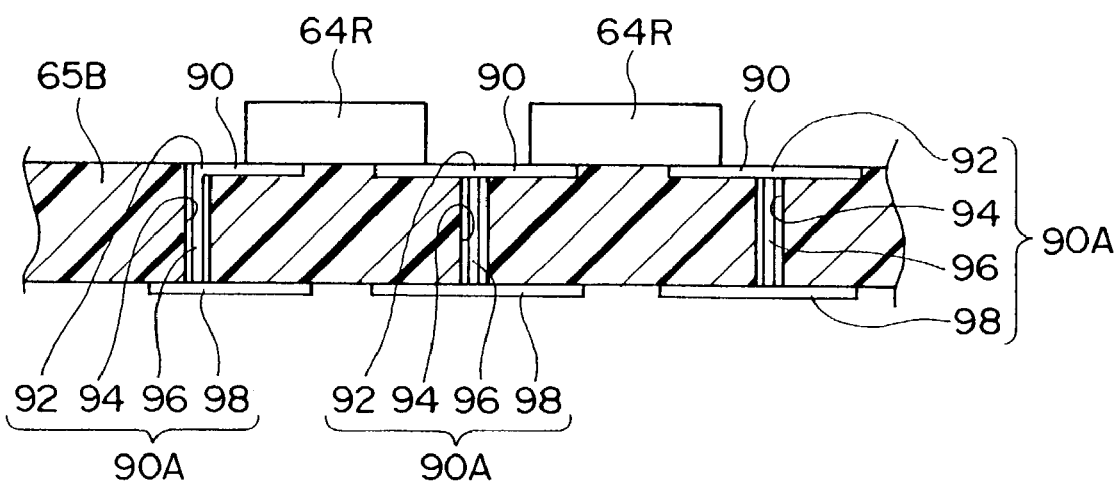
FIG. 3 is a cross-sectional view taken along the 3—3 direction of FIG. 2.

A heat dissipating mechanism is provided at the second substrate 65B which is formed of glass epoxy and on which the LED chips 64R which emit light of the R color are mounted. As shown in FIGS. 2 and 3, the heat dissipating mechanism is provided integrally with the printed wiring of the second substrate 65B.

Thus, heat conducting structures 90A for heat dissipation, which are connected to wiring structures 90 for conducting electricity, are provided at the second substrate 65B at spaces at predetermined intervals, between the LED chips 64R mounted to the surface of the second substrate 65B.

Because it suffices to provide only the LED chips 64R at the second substrate 65B, there is more space as compared with the first substrate 65A at which the LED chips 64G, 64B and the LED chips 64IR are mounted. The conditions for providing the heat conducting structures 90A for heat dissipation are good at the second substrate 65B.

The wiring structures 90 for conducting electricity supply electricity to the respective LED chips 64R, and therefore form the printed wiring laid on the surface of the second substrate 65B.

In order to form the heat conducting structures 90A at the second substrate 65B, surface heat dissipating portions 92 are formed which are portions of the wiring structures 90 and which are connected in cross-like shapes to the intermediate portions of the conductive wires connecting the respective LED chips 64R, so as to enable transfer of heat energy.

Through holes 94, which pass through from the obverse surface to the reverse surface of the second substrate 65B, are formed in the second substrate 65B at portions corresponding to the both end portions of each surface heat dissipating portion 92.

Heat conducting portions 96 are provided integrally with the both end portions of each surface heat dissipating portion 92. The heat conducting portion 96 passes through the through hole 94 so as to penetrate through the second substrate 65B from the obverse surface to the reverse surface thereof.

The end portion of the heat conducting portion 96 at the reverse surface of the second substrate 65B is integrally connected to a heat dissipating surface portion 98 provided at the reverse surface of the second substrate 65B, such that heat can be conducted to the heat dissipating surface portion 98.

The heat dissipating surface portion 98 is shaped as a rectangular plane, and is formed integrally with the reverse surface of the second substrate 65B by the structure of a printed wiring. The head dissipating surface portions 98 are disposed so as to be provided at intervals such that adjacent heat dissipating surface portions 98 are electrically insulated.

The wiring structures 90 for conducting electricity and the heat conducting structures 90A for heat dissipation can be simultaneously manufactured as an integral printed wiring pattern on the second substrate 65B.

When heat energy due to the heat generated when the LED chips 64R are lit is conducted to the wiring structures 90 for conducting electricity, the heat conducting structures 90A for heat dissipation, which are formed on the second substrate 65B, as described above, transfer the heat energy to the heat dissipating surface portions 98 through the heat conducting portions 96 from the surface heat dissipating portions 92 connected to the wiring structures 90.

At this time, the heat conducting structures 90A dissipate the transferred heat energy into the atmosphere or the like from the surface heat dissipating portions 92 and the heat dissipating surface portions 98, and dissipate the heat toward the second substrate 65B side so as to work to cool the LED chips 64R.

The heat dissipating ability of the heat conducting structures 90A can be increased by increasing the amount of metal used in the printed wiring structures forming the heat conducting structures 90A.

Because the second substrate 65B is formed of glass epoxy, its heat conductivity is relatively poor. Accordingly, the second substrate 65B alone cannot dissipate the heat of the LED chips 64R. However, by providing the heat conducting structures 90A for heat dissipation, the heat of the LED chips 64R is sufficiently dissipated and the LED chips 64R are sufficiently cooled, and the emission of light by the LED chips 64R can be made stable.

Accordingly, the substrate 65 of the light source device can be manufactured inexpensively by using the second substrates 65B made of glass epoxy as a portion of the substrate 65.

As shown in FIG. 1, at the substrate 65 of the light source device, as described above, the first substrates 65A are disposed symmetrically with respect to the center of the substrate 65, and in the same way, the second substrates 65B also are disposed symmetrically with respect to the center of the substrate 65. Namely, the substrate 65 of the light source device is formed by the first substrates 65A and the second substrates 65B being disposed alternately.

At the substrate 65 of the light source device, the plurality of LED chips 64G, 64B emitting G color and B color lights and the plurality of LED chips 64IR emitting infrared rays are mounted to the first substrates 65A, and the LED chips 64R emitting R color light are mounted to the second substrates 65B. However, the substrate 65 maybe structured such that the plurality of LED chips 64R, 64G, 64B emitting lights of R color, G color and B color are mounted to the first substrates 65A, and the LED chips 64IR emitting infrared rays are mounted to the second substrates 65B.

Namely, the substrate 65 may be structured such that the LED chips 64R, which are light emitting elements which emit red color light for reading image information by the red color light being transmitted through or reflected by the image of the original, are disposed at either the first substrates 65A or the second substrates 65B, and the LED chips 64IR, which are light emitting elements which emit infrared ray light which is invisible light, are disposed at the other of the first substrates 65A and the second substrates 65B.

Further, the substrate 65 of the light source device may be structured such that at least the LED chips 64R which emit light of the R color are mounted to the first substrates 65A, at least the LED chips 64IR which emit infrared rays are mounted to the second substrates 65B, and the plurality of LED chips 64G, 64B which emit light of G color and B color respectively are appropriately mounted either to the first substrates 65A or the second substrates 65B.

Moreover, a structure is possible in which at least the LED chips 64IR which emit infrared rays are mounted to the first substrates 65A, at least the LED chips 64R which emit light of the R color are mounted to the second substrates 65B, and the plurality of LED chips 64G, 64B which emit light of G color and B color respectively are appropriately mounted either to the first substrates 65A or the second substrates 65B.

In accordance with the above-described structure, the R color, G color, B color and infrared ray lights which are respectively irradiated from the substrate 65 of the light source device can be distributed uniformly on the optical path of the optical system in the CCD scanner section 14.

Figure 6:
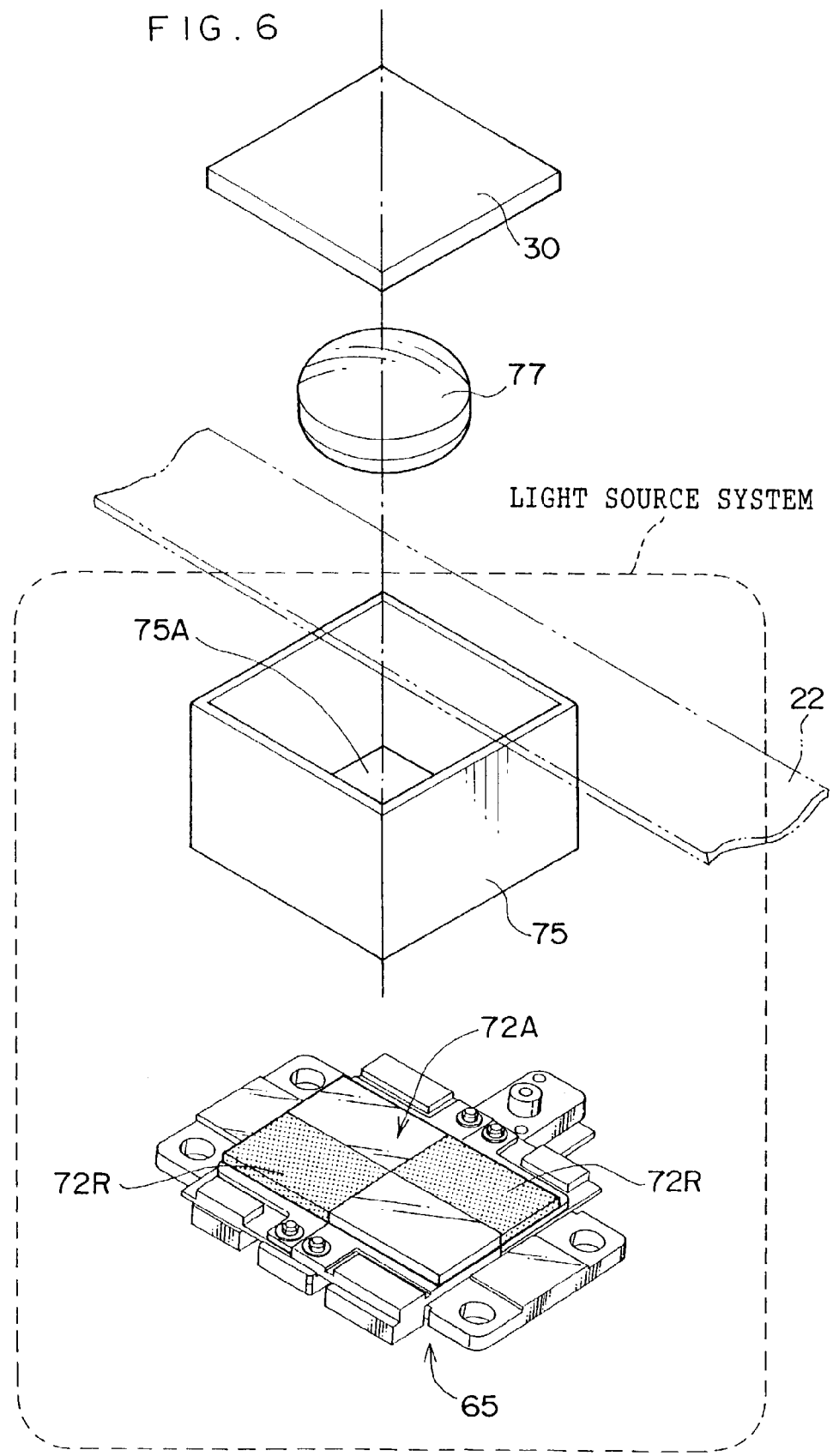
FIG. 6 is a schematic structural view showing a charge-couple device (CCD) scanner section equipped with the light source device of FIG. 1.

As shown in FIGS. 1 and 6, an infrared ray cutting filter 72A, which cuts infrared rays at local areas, is disposed in a vicinity directly above the light emitting surface side of the substrate 65, integrally with the substrate 65 at which the aluminum or ceramic first substrates 65A and the glass epoxy second substrates 65B are combined.

The infrared ray cutting filter 72A functions as a filter which cuts excess infrared rays which are emitted from the substrate 65 as described above, in accordance with the checkered pattern arrangement of the first substrates 65A and the second substrates 65B of the substrate 65.

Namely, the infrared ray cutting filter 72A is divided into a checkered pattern of a size corresponding to the checkered pattern of the substrate 65. At the areas corresponding to directly above the first substrates 65A at which the LED chips 64G, 64B and the LED chips 64IR are mounted, filter portions 72T (e.g., transparent glass or the like) which do not cut infrared rays are provided as transmitting members.

Further, at the infrared ray cutting filter 72A, filter portions 72R which cut infrared rays are disposed at the areas corresponding to directly above the second substrates 65B at which the plurality of LED chips 64R which emit light of the R color are mounted.

Figure 7:
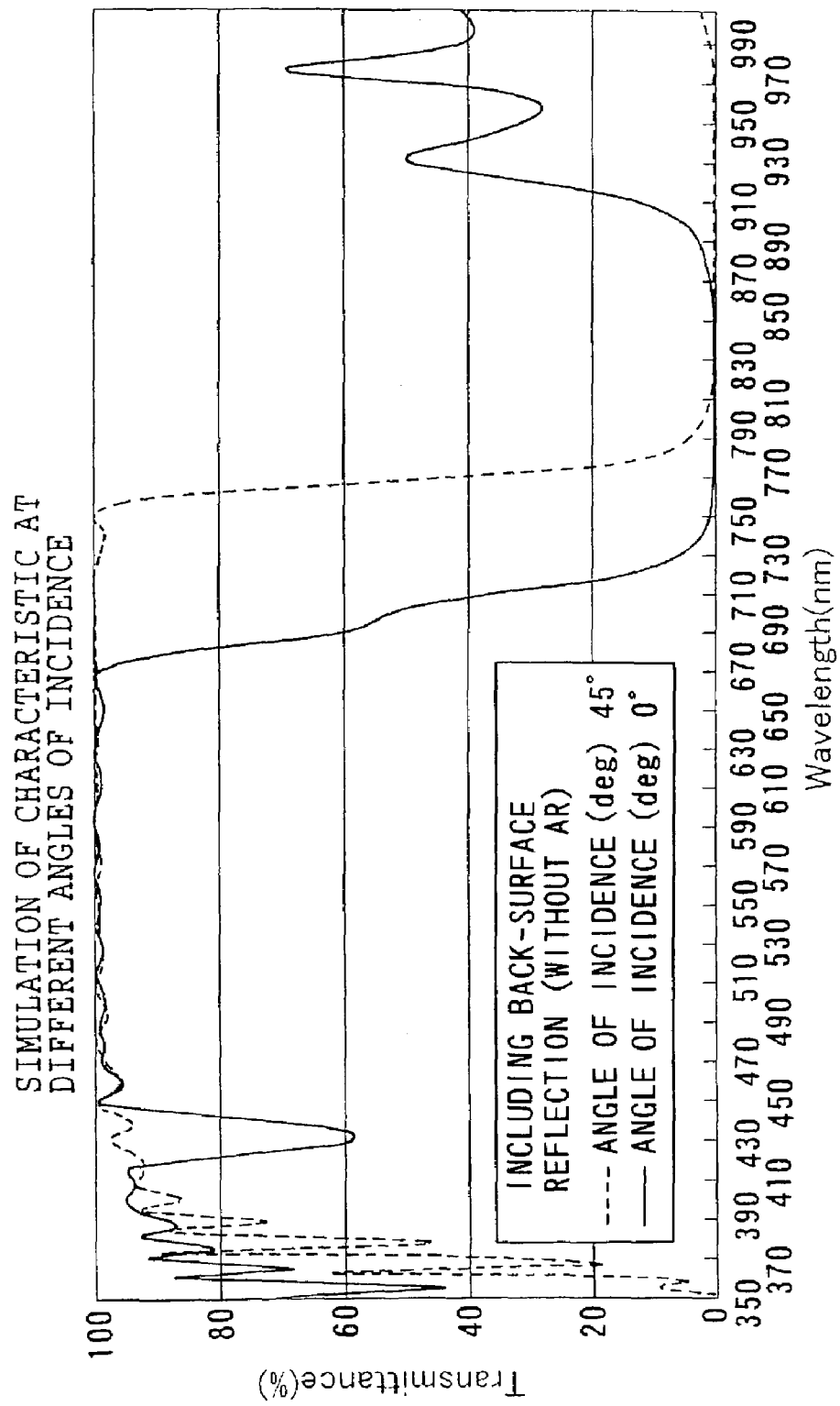
FIG. 7 is a characteristic diagram showing the characteristic of an infrared ray cutting filter relating to the embodiment of the present invention.

The filter portions 72R, which cut infrared rays and are light damping members, have the characteristic shown in FIG. 7. Namely, the filter portion 72R has a characteristic of being able to cut, to at least 50% or less, the sub-emitted light in a vicinity of the wavelength of 860 nm which is the secondary peak, which sub-emitted light is included in the light emitted from the LED chips 64R which are the LED elements which emit light of the R color of the quaternary LED element.

Moreover, the filter portion 72R has the characteristic of being able to cut, to at least 50% or less, the sub-emitted light included in the light emitted from the LED chips 64R, not only for light incident on the filter portion 72R at an angle of incidence of 0° (i.e., incident orthogonal to the flat surface of the filter portion 72R), but also for light incident on the filter portion 72R over a relatively wide range of angles of incidence (e.g., at an angle of incidence of 45° as shown as an example in FIG. 7).

Moreover, the infrared ray cutting filter 72A is formed in a rectangular shape of substantially the same size as the light-emitting surface on the substrate 65. Thus, the infrared ray cutting filter 72A also functions as a dust proofing protection which prevents dust from falling onto and adhering to the light emitting surface of the substrate 65.

When the infrared ray cutting filter 72A is disposed on the first substrates 65A and the second substrates 65B, as described above, and the filter portions 72R which cut infrared rays are disposed so as to correspond to the light emitting sides of the second substrates 65B at which the LED chips 64R are mounted, the filter portions 72R can cut only the sub-emitted light which the LED chips 64R emit.

At the same time, at the infrared ray cutting filter 72A, filter portions which do not cut infrared rays correspond to the areas corresponding to directly above the first substrates 65A at which the LED chips 64G, 64B and the LED chips 64IR which emit infrared rays are mounted. In this way, the lights of G and B colors, which are lights of wavelengths in the visible light range at the quaternary LED light source, and the infrared rays emitted by the infrared ray LED elements for defect portion detection, are transmitted through.

Namely, the LED chips 64R which emit R color lights and are quaternary LED elements, have the characteristic of emitting light of the wavelength as indicated by a two dot chain line shown in FIG. 8, and emit a sub-emitted light which is a light having a secondary peak wavelength whose wavelength is about 860 nm which is within the range of an infrared ray wavelength.

Thus, the sub-emitted light in a vicinity of the wavelength of 810 nm to 910 nm is cut to 50% or less by the infrared ray cutting filter 72A.

In this way, the contrast degree of the image information of the red color light in the original image, which wavelength is in the visible light range, can be read accurately.

Further, since the infrared ray cutting filters 72A are not disposed at areas corresponding to directly above the first substrates 65A at which the LED chips 64IR are mounted, the infrared rays emitted from the LED chips 64IR, which have the characteristic indicated by a solid line in FIG. 8, are not attenuated. Thus, the infrared rays emitted from the LED chips 64IR can be utilized to detect defect portions of the original effectively.

Accordingly, the CCD scanner section 14 of the image reading device utilizes the R color, G color and B color lights emitted by the quaternary LED light source, and suppresses unevenness of the light-quantity at the film surface, and can carry out the processing of reading an image of high image quality.

Further, when defect portions are detected by using the infrared rays emitted by the infrared ray LED elements, the portions at which light is scattered due to scratches or the like can be accurately detected, and image processings, such as scratch eliminating correction of the film by using the read image data can be carried out appropriately.

Moreover, because the infrared ray cutting filter 72A is disposed at a position away from the CCD sensor 30, the concern that optical flare will occur can be mitigated.

As described above, the R color, G color and B color LED chips 64R, 64G, 64B may be mounted at the first substrates 65A formed of aluminum or ceramic, and the LED chips 64IR which emit infrared rays may be mounted on the second substrates 65B formed of glass epoxy so as to correspond to the conditions required by the variation levels of the light-quantity and wavelength or the like of the light emitting elements.

In the case of this structure, at the infrared ray cutting filter 72A, the filter portions 72R for cutting infrared rays are disposed at areas corresponding to directly above the first substrates 65A at which the LED chips 64R, 64G, 64B are mounted, and the filter portions 72T which do not cut infrared rays are disposed at areas corresponding to directly above the second substrates 65B at which the LED chips 64IR emitting infrared rays are mounted.

Although the ability to conduct heat of the second substrates 65B made of glass epoxy is inferior to that of the first substrates 65A, the image data read by the infrared rays is only used in image processings such as scratch eliminating correction of the film or the like. Thus, even if the LED chips 64IR emitting infrared rays are heated somewhat and a certain amount of wavelength fluctuation arises in the emitted infrared rays, no problems arise in the image correction processing.

Moreover, when image processing such as scratch eliminating correction of the film or the like is carried out, the LED chips 64IR emitting infrared rays carry out so-called pixel shifting. For example, the quantity of light of LED chip 64IR, which emits infrared ray changing within approximately four-second period and causing the pixel shifting, should be suppressed.

Accordingly, it is possible to eliminate aging and wavelength inspection for products in which the LED chips 64IR emitting infrared rays are mounted to the second substrates 65B made of glass epoxy and having a poor heat conducting ability, and the device can be manufactured less expensively.

Further, the LED chips 64R, 64G, 64B which emit light of the respective colors of R, G, B are for carrying out the processing of reading the image. The LED chips 64IR which emit infrared rays are for carrying out image processings such as scratch eliminating correction of the film and the like. Accordingly, if the LED chips 64R, 64G, 64B and the LED chips 64IR are disposed so as to be divided over the first substrates 65A and the second substrates 65B, even if trouble arises with one of the first substrates 65A or the second substrates 65B, it suffices to replace only the first substrates 65A or the second substrates 65B, which is convenient for repair.

In the present embodiment, description is given of a structure in which the LED chips 64R, 64G, 64B which emit lights of R color, G color and B color and the LED chips 64IR which emit infrared rays are mounted to the first substrates 65A made of aluminum or ceramic and the second substrates 65B made of glass epoxy. However, a structure may be used in which generally-used light emitting elements are mounted to the first substrates 65A formed of aluminum or ceramic and the second substrates 65B formed of glass epoxy. Alternately, electroluminescent (EL) elements may be mounted so as to form a light source having various light-emitting characteristics.

In the embodiment described above, the substrate 65 is formed as a substrate group 65 by integrating the first substrates 65A formed of aluminum or ceramic and the second substrates 65B formed of glass epoxy. However, in accordance with the conditions of the light-quantity and wavelength required by the light emitting elements, the substrate 65 may be formed by integrating first and second substrates which are both formed of glass epoxy that have different specifications from each other. Alternately, the substrate 65 may be formed by integrating first and second substrates which are both formed of aluminum or ceramic that mutually have different specifications from each other.

For example, the substrate 65 of the light source maybe formed by integrating first substrates formed of glass epoxy, which have heat conducting structures 90A for heat dissipation that dissipate relatively large amounts of heat disposed thereon, and second substrates formed of glass epoxy, which have heat conducting structures 90A for heat dissipation that dissipate relatively small amounts heat disposed thereon. In this way, the substrate 65 of the light source can be produced inexpensively by utilizing two pairs of glass epoxy substrates having different specifications.

Alternately, the substrate 65 of the light source may be formed by integrating first substrates formed of aluminum or ceramic that dissipate relatively large amounts of heat, and second substrates formed of aluminum or ceramic that dissipate relatively small amounts of heat and are inexpensive, integrally. In this way, the substrate 65 as a hole of the light source can be produced inexpensively since the second substrates are formed of inexpensive material.

Next, the light source device of the CCD scanner section 14 will be described in further detail.

The LED chips 64B, 64R, 64G and 64IR, which are the large number of light emitting elements disposed on the substrate 65 of the light source device, can be controlled so as to be made to emit light on a group-by-group basis, with the LED chips 64B, the LED chips 64R, the LED chips 64G and the LED chips 64IR each being a group. In this way, the LED chip groups can emit lights of the respective colors of R, G, B and infrared rays in which there is extremely little unevenness of the light-quantity among the respective lights.

The LED chip groups mounted on the substrate 65 are disposed so as to be positioned below the conveying path of the photographic film 22 as shown in FIG. 6, such that the irradiating direction in which the LED chip groups emit light opposes the irradiated surface of the photographic film 22 disposed at the reading position.

Further, as shown in FIG. 6, a diffusion box or a mirror box 75, which serves as a light diffusing member and which suppresses diffusion of light outside of a predetermined region and which diffuses light within the predetermined region such that the light-quantity become uniform, is provided between the substrate 65 and the conveying path of the photographic film 22.

The mirror box 75 is shaped as a rectangular tube, and the inner side surfaces thereof are mirror surfaces. A dust proofing protective glass 75A is fixed and mounted to the lower end portion of the mirror box 75, i.e., the end portion which is near to and opposes the substrate 65. In this way, dust can be prevented from falling down toward the substrate 65 and from floating up into and adhering to the interior of the mirror box 75.

As shown in FIG. 6, the optical system of the CCD scanner section 14 is structured such that the light projected from the LED chip groups of the substrate 65 passes through the infrared cutting filter 72A and the interior of the mirror box 75, and is led to the photographic film 22 conveyed to the reading position. Namely, when the LED chips 64R, 64G, 64B emit lights of the respective colors of R, G and B, the R, G, B lights pass through the infrared ray cutting filter 72A and pass through the mirror box 75 and are irradiated onto the photographic film 22 which is at the reading position.

Further, the light emitted from the LED chips 64IR also passes through the infrared ray cutting filter 72A, follows the same optical path as the RGB lights, passes through the interior of the mirror box 75, and is irradiated onto the photographic film 22 conveyed to the reading position.

In the optical system of the CCD scanner section 14, a lens unit 77 and the CCD sensor 30 are disposed in this order along the optical axis of the LED chip groups of the substrate 65, at the side of the conveying path of the photographic film 22 opposite the side at which the mirror box 75 is provided, so as to interpose the photographic film between the mirror box 75 and the lens unit 77. The lens unit 77 focuses the light which has been transmitted through the frame image, and the CCD sensor 30 is an image pick-up element.

The lens unit 77 is a zoom lens formed from a plurality of lenses, and focuses the light, which has been transmitted through the photographic film 22, onto the CCD sensor 30 which is disposed at a predetermined position.

The CCD sensor 30 is an area sensor in which a plurality of pixels detecting light are arrayed two-dimensionally along the width and the conveying direction of the photographic film 22. Each pixel has the functions of photoelectrically converting the light it receives and accumulating charges.

In this way, the transmitted lights of the respective colors of R, G, B and the infrared light, which have passed through the frame image of the photographic film 22, are focused per frame image onto the range of substantially all of the pixels of the CCD sensor 30 by the lens unit 77, such that the frame image is electrically read.

Next, the effects and operation of the CCD scanner section 14 of the digital lab system 10 equipped with the image reading device relating to the present embodiment, will be described.

At the digital lab system 10, first, an operator inserts the photographic film 22 into a negative carrier 74 (see FIG. 5) which is a film carrier. Next, when starting of reading of the frame images is instructed by a keyboard 16K (see FIG. 4) of the image processing section 16, the negative carrier 74 starts to convey the photographic film 22.

Then, prescanning of the photographic film 22 which is being conveyed is carried out, such that the frame images are preliminarily read. Namely, while the photographic film 22 is conveyed at a relatively high speed, the CCD scanner 14 reads not only the image frame at the reading position, but also various types of image data outside of the image recorded region of the photographic film 22. Note that the read image is displayed on a monitor 16M.

Reading conditions for reading the image again, i.e., reading conditions for so-called fine scanning, are set for each frame image on the basis of the results of prescanning of the frame image. When setting of the reading conditions for fine scanning has been completed for all of the frame images, fine scanning of the respective frame images is carried out while the photographic film 22 is conveyed in the direction opposite to the direction of conveying at the time of prescanning.

At this time, because the photographic film 22 is being conveyed in the direction opposite to the conveying direction at the time of prescanning, fine scanning is carried out in order from the final frame to the first frame. Further, the conveying speed during the fine scanning is set to be slower than that during the prescanning. In this way, the reading resolution is increased.

Moreover, the state of the image, e.g., the aspect ratio of the photographed image, the photographed state (underexposed, normally exposed, overexposed, ultra-overexposed, or the like), whether photographing was carried out using a flash or not, and the like, are ascertained during prescanning. Therefore, the image can be read under appropriate reading conditions during the fine scanning.

Further, scratch eliminating processing is carried out during fine scanning. Namely, the irradiated lights of the respective colors of R, G, and B pass through the infrared ray cutting filter 72A, pass through the mirror box 75 so as to be irradiated onto the photographic film 22 with scattering of the light-quantity thereof suppressed, and pass through the photographic film 22. Thereafter, these lights are focused onto the CCD sensor 30 by the lens unit 77, such that the frame image is read.

Thereafter, the LED chips 64IR emit infrared rays which are invisible light. The infrared rays are irradiated onto the film, and scratches in the film surface or dust or the like on the optical path are read by the CCD sensor 30. The image processing section 16 carries out image correction processing on the image read by the lights of the colors of R, G, B.

Accordingly, by using lights of R color, G color and B color which are emitted by a quaternary LED light source, the CCD scanner section 14 can suppress unevenness of the light-quantity at the film surface, and can perform a high image quality image reading process.

Further, when defect portions are detected by using the infrared rays emitted by the infrared ray LED elements, portions at which light is scattered due to scratches or the like can be accurately detected, and image processings such as scratch eliminating correction and the like of the film can be appropriately carried out by utilizing the read image data.

Note that the CCD scanner section 14 is not limited to a CCD scanner using an area type CCD sensor 30. The CCD scanner section 14 may be structured so as to use a line-type CCD sensor to read images while conveying a film.

What is claimed is:

1. A light source device for an image reading device, the light source device comprising:
   a substrate group formed from first substrates and second substrates, and in which a pair of the first substrates are disposed symmetrically with respect to a center of the substrate group, and a pair of the second substrates are disposed symmetrically with respect to the center of the substrate group and at positions that are different than positions of the first substrates;

light emitting elements, which emit red color light and are disposed at one of the first substrates and the second substrates; and light emitting elements, which emit infrared rays and are disposed at the other of the first substrates and the second substrates.

2. The light source device for an image reading device of claim 1, wherein the first substrates are formed from one of an aluminum material and a ceramic material, and the second substrates are formed from a glass epoxy material, the first substrates include light emitting elements, which emit green color light, light emitting elements, which emit blue color light, and the light emitting elements, which emit infrared ray, and the second substrates include the light emitting elements, which emit red color light.

3. The light source device for an image reading device of claim 1, wherein the first substrates are formed from one of an aluminum material and a ceramic material, and the second substrates are formed from a glass epoxy material, the first substrates include light emitting elements, which emit green color light, light emitting elements, which emit blue color light, and the light emitting elements, which emit red color light, and the second substrates include the light emitting elements, which emit infrared rays.

4. The light source device for an image reading device of claim 2, further comprising a heat dissipating mechanism including:

wiring structures for conducting electricity to the light emitting elements mounted on the second substrates; and heat conducting structures for heat dissipation which are connected to the wiring structures for conducting electricity so as to be able to transfer heat energy, and which cool the light emitting elements by dissipating heat by conducting, to heat dissipating portions, the heat energy transferred from the portions of the heat conducting structures connected to the wiring structures for conducting electricity.

5. The light source device for an image reading device of claim 1, wherein the light emitting elements comprise light emitting diodes.

6. The light source device for an image reading device of claim 1, wherein the light emitting elements comprise electroluminescent elements.

7. A light source device for an image reading device, the light source device comprising:

a substrate;

a first light emitting element emitting red color light for reading image information of an image of an original by the emitted light being at least one of transmitted through and reflected by the original, the first light emitting element including a secondary peak emission, a wavelength of which corresponds to infrared ray wavelength region;

a second light emitting element emitting infrared rays, which are invisible, utilized for detecting defect portions of the original and dust existing on an optical path of an optical system; and a light damping member for damping the light in an infrared ray wavelength of the first light emitting element and disposed on the path by which the light emitted by the first emitting element reaches an image pick-up device of the image reading device, wherein the first light emitting element and the second light emitting element are disposed on the substrate.

8. The light source device for an image reading device of claim 7, wherein the substrate on which the first light emitting element is disposed and the substrate on which the second light emitting element is disposed are separately formed, and one of the substrates comprises one of aluminum material and ceramic material, and the other comprises glass epoxy material.

9. A light source device comprising:

at least one first substrate;

at least one second substrate;

first light emitting elements, which emit red color light; and second light emitting elements, which emit infrared rays, wherein the first light emitting elements are disposed on the first substrate, and the second light emitting elements are disposed on the second substrate, wherein at least one pair of the first substrates and at least one pair of the second substrates are provided, and the first substrates and the second substrates are disposed alternately.

10. The light source device of claim 9, the second substrate further comprising at least one of light emitting elements, which emit green color light and light emitting elements, which emit blue color light.

11. The light source device of claim 9, the first substrate further comprising at least one of light emitting elements, which emit green color light and light emitting elements, which emit blue color light.

12. The light source device of claim 11, wherein the first substrate is formed of a material having a heat conducting ability which is superior to a heat conducting ability of the second substrate.

13. The light source device of claim 10, wherein the second substrate is formed of a material having a heat conducting ability which is superior to a heat conducting ability of the first substrate.

14. The light source device of claim 9, further comprising a heat dissipating mechanism dissipating heat generated by the light emitting elements.

15. The light source device of claim 9, further comprising:

a light damping member, which dampens the infrared rays; and a transmitting member through which the infrared rays pass, wherein the light damping member is disposed to correspond to the first substrate and the transmitting member is disposed to correspond to the second substrate.

16. The light source device of claim 9, wherein at least one of the first substrate and the second substrate is formed from any of a glass epoxy material, an aluminum material, and a ceramic material.

17. The light source device of claim 9, wherein the first light emitting elements and the second light emitting elements are formed from light emitting diodes.

18. The light source device of claim 9, wherein the first light emitting elements and the second light emitting elements are formed from electroluminescent elements.

* * * * *